(12) United States Patent
Robinson et al.

(10) Patent No.: US 9,152,964 B1
(45) Date of Patent: Oct. 6, 2015

(54) SYSTEM AND METHOD FOR BIOMETRIC SIGNATURE AUTHORIZATION

(75) Inventors: Timothy L. Robinson, Reston, VA (US); Bradford R. Schildt, Boulder, CO (US); Tennille V. Goff, Springfield, VA (US); Daniel J. Corwin, Canonsburg, PA (US); Timothy Neil Watson, Alexandria, VA (US)

(73) Assignee: Open Invention Network, LLC, Durham, NC (US)

( * ) Notice: Subject to any disclaimer, the term of this patent is extended or adjusted under 35 U.S.C. 154(b) by 578 days.

(21) Appl. No.: 13/176,847

(22) Filed: Jul. 6, 2011

Related U.S. Application Data

(63) Continuation of application No. 11/123,111, filed on May 6, 2005, now Pat. No. 8,015,118.

(51) Int. Cl.
*G06Q 20/40* (2012.01)
*G06Q 20/38* (2012.01)

(52) U.S. Cl.
CPC ........ *G06Q 20/40145* (2013.01); *G06Q 20/382* (2013.01)

(58) Field of Classification Search
CPC ................................................ G06Q 20/40145
See application file for complete search history.

(56) References Cited

U.S. PATENT DOCUMENTS

| | | | |
|---|---|---|---|
| 5,664,109 A * | 9/1997 | Johnson et al. ................... 705/2 |
| 5,748,765 A | 5/1998 | Takhar | |
| 5,764,789 A | 6/1998 | Pare et al. | |
| 5,898,156 A | 4/1999 | Wilfong | |
| 6,002,787 A | 12/1999 | Takhar et al. | |
| 6,039,248 A * | 3/2000 | Park et al. ...................... 235/379 |
| 6,171,112 B1 * | 1/2001 | Clark et al. .................... 434/322 |
| 6,192,165 B1 * | 2/2001 | Irons ............................. 382/306 |
| 6,307,955 B1 | 10/2001 | Zank | |
| 6,366,682 B1 | 4/2002 | Hoffman et al. | |
| 6,367,013 B1 | 4/2002 | Bisbee et al. | |
| 6,401,066 B1 * | 6/2002 | McIntosh ....................... 704/273 |
| 6,553,494 B1 | 4/2003 | Glass | |
| 6,720,712 B2 | 4/2004 | Scott et al. | |
| 6,728,881 B1 | 4/2004 | Karamchetty | |
| 6,755,344 B1 | 6/2004 | Mollett et al. | |
| 7,265,853 B1 * | 9/2007 | Kara et al. .................... 358/1.15 |

(Continued)

FOREIGN PATENT DOCUMENTS

| WO | WO 0075884 A1 * | 12/2000 |
| WO | WO-0118720 A1 | 3/2001 |

OTHER PUBLICATIONS

Borreson Caruso, Judy, Making Online Transactions Legal, Enforceable and Secure: Electronic Signature, Oct. 21, 2004, University of Wisconsin-Madison, all pages.*

(Continued)

*Primary Examiner* — Jacob C. Coppola
(74) *Attorney, Agent, or Firm* — Haynes and Boone, LLP

(57) ABSTRACT

A system and method of obtaining and storing a signed agreement authorizing the use of a user's biometric data for the purpose of offering legal consent to agreements and transactions with one or more operators. The present invention imparts a process by which merchants and other service providers can access a verifying agreement indicating a user's intent to submit biometric data as a substitute for a written signature and the user's consent to abide by the terms and conditions of any agreements entered into by the submission of biometric data.

17 Claims, 2 Drawing Sheets

(56) References Cited

U.S. PATENT DOCUMENTS

| | | | |
|---|---|---|---|
| 7,464,059 B1* | 12/2008 | Robinson et al. | 705/67 |
| 7,698,230 B1* | 4/2010 | Brown et al. | 705/75 |
| 2001/0052541 A1 | 12/2001 | Kang et al. | |
| 2001/0053238 A1 | 12/2001 | Katsura et al. | |
| 2002/0026365 A1 | 2/2002 | Natanzon | |
| 2002/0062228 A1* | 5/2002 | Portnoy et al. | 705/3 |
| 2002/0091651 A1* | 7/2002 | Petrogiannis et al. | 705/76 |
| 2002/0174067 A1 | 11/2002 | Hoffman et al. | |
| 2003/0033168 A1* | 2/2003 | Califano et al. | 705/3 |
| 2003/0062202 A1 | 4/2003 | Parry | |
| 2003/0130867 A1* | 7/2003 | Coelho et al. | 705/2 |
| 2003/0138135 A1* | 7/2003 | Chung et al. | 382/119 |
| 2004/0030579 A1* | 2/2004 | Gil et al. | 705/2 |
| 2004/0059924 A1 | 3/2004 | Soto et al. | |
| 2004/0133454 A1* | 7/2004 | Desio | 705/2 |
| 2004/0193538 A1* | 9/2004 | Raines | 705/39 |
| 2005/0177389 A1* | 8/2005 | Rakowicz et al. | 705/1 |
| 2005/0209884 A1* | 9/2005 | Gil et al. | 705/2 |
| 2006/0157559 A1* | 7/2006 | Levy et al. | 235/380 |
| 2006/0178913 A1* | 8/2006 | Lara et al. | 705/3 |
| 2007/0192275 A1 | 8/2007 | Foygel et al. | |
| 2007/0214120 A1* | 9/2007 | Niendorff | 707/3 |
| 2009/0070270 A1* | 3/2009 | Robinson et al. | 705/66 |

OTHER PUBLICATIONS

Dept. Of Commerce, Electronic Signatures in Global and National Commerce Act, Jun. 2001, Dept. of Commerce, all pages.*

Germain, J., "Electronic Signatures: The Proof is in the Process", TechNews World online http://technewsworld.com/story/35016.html, Jul. 9, 2004.

White, "How Computers Work", Millennium Edition, 1999, Que Corporation, Indianapolis, IN., all pages.

Derfler, "How Networks Work", Bestseller Edition, 1996, Ziff-Davis, Emeryville, CA, all pages.

Gralla, "How the Internet Works", Millenium Edition, 1999, Que Corporation, Indianapolis, IN., all pages.

Muller, "Desktop Encyclopedia of the Internet", 1999, Artech House Inc., Norwood, MA, all pages.

Gosnell, D., "Legality of electronic signatures brings up questions", Tampa Bay Business Journal Online (bizjournals.com/tampabay/stories/2000/09/04/focus5.html) Sep. 2005.

Doherty, S., "Marking E-Signatures Count", Network Computing's SmallBizPipeline (http://nwc.smallbizpipeline.com/30900013) Aug. 2004.

Abbott, S., "When is an e-signature not a signature at all?" Serverworld (http://www.serverworldmagazine.com/monthly/2001/06/esignature.shtml) Jun. 2001.

* cited by examiner

SYSTEM AND METHOD FOR BIOMETRIC SIGNATURE AUTHORIZATION

CROSS REFERENCE TO RELATED APPLICATIONS

This application is a continuation of application Ser. No. 11/123,111 filed May 6, 2005, titled SYSTEM AND METHOD FOR BIOMETRIC SIGNATURE AUTHORIZATION, incorporated by reference herein, in its entirety, for all purposes.

FIELD OF THE INVENTION

This application relates generally to the submission of biometric data as an electronic signature. More particularly, the present invention relates to a system and method for authorizing and legally validating the submission of biometric data as an electronic signature as a substitute for a written signature.

BACKGROUND OF THE INVENTION

Generally, current methods of utilizing biometric data as an electronic signature may not be accepted by some merchants or service providers, particularly for transactions that involve significant financial exchanges or contractual agreements. What is needed is a system and method that makes reluctant merchants and service providers more likely to accept biometric data as a valid signature.

SUMMARY OF THE INVENTION

The present invention addresses the aforementioned needs by providing a system and a method for formally authorizing the submission of a user's biometric data as a legal substitute for a handwritten signature and for providing merchants and service providers with a means of accessing and confirming the user's biometric signature authorization.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
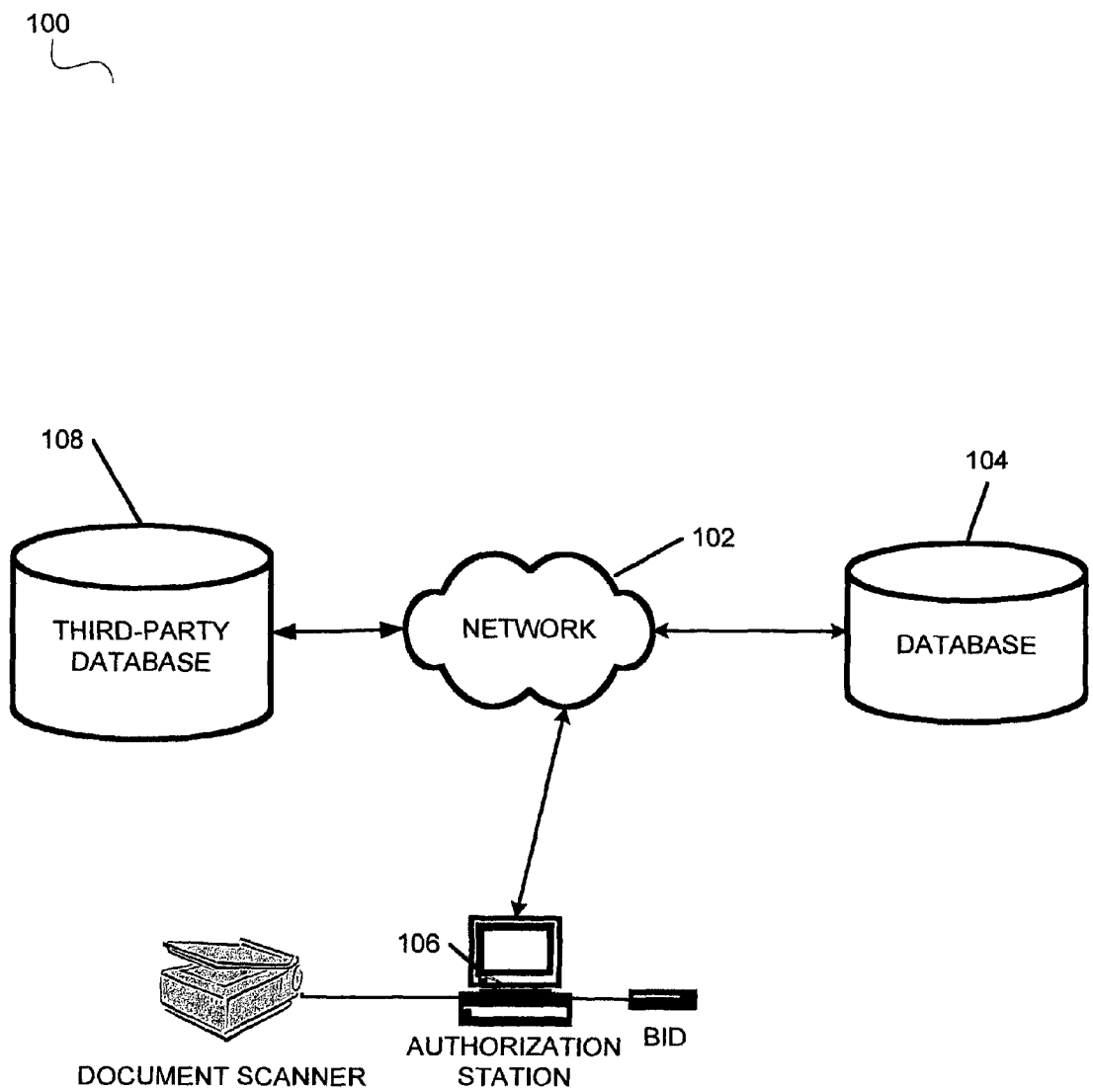
FIG. 1 illustrates a general architecture overview of a biometric authorization system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Methods of submitting biometric data as an electronic signature should comply with the "Electronic Signatures Act" (ESA), which grants legal signature standing to an electronic sound, symbol or process that is "attached" to a contract or other record and adopted by a person with an interest in signing. Nevertheless, it is generally understood that various electronic signatures have differing levels of legal standing and trustworthiness in the eyes of contracting parties and potentially in the view of courts as well. Consequently, not all merchants and service providers may be willing to accept biometric data as a valid electronic signature for certain types of transactions and agreements.

The present invention offers an advantage to users of a biometric authorization system (BAS) by making it more likely that they can present biometric data to merchants and other operators as a substitute for a handwritten signature. The ability to substitute submitted biometric data for written authorization signatures is a significant convenience for users of a BAS. Moreover, while a handwritten signature is often considered a form of biometric, not all forms of biometric data are equally reliable. While a written signature may be convincingly forged, a user's biometric data collected from personal characteristics, such as fingerprint or iris scans, is intrinsically linked to that particular user, and his submitted biometric data may be readily checked against stored data in real time, with greater accuracy than a written signature comparison, in order to authenticate the identity of a user who is submitting his electronic signature.

Another advantage of the present invention is that it provides merchants who might be reluctant to accept biometric signatures with an electronically stored copy of a signed consent form from users expressly authorizing the submission of their biometric data for that purpose and agreeing to be legally bound by the terms of transactions so signed. Additionally, the present invention streamlines the conduct of business for users, merchants and service providers. The substitution of biometric data as an electronic signature in lieu of a handwritten signature offers significant savings of time, the convenience of electronic storage and record keeping, and the elimination of multiple paper agreements with attendant storage and filing issues.

In general, a biometric authorization refers to an authorization in which either a user, an operator, such as a merchant or clerk, or an agent, such as an employee of the BAS, provides biometric data to be matched against a biometric record in a database. For example, a user can undergo biometric authorization to complete various forms of transactions, such as a financial transaction or expressing consent to a service agreement or contract. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered. In addition, biometric data received during an authorization can be tested for liveness to prevent system fraud.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template can be a mathematical representation of more than one biometric. For example, a user template can be generated from biometric data acquired from two individual fingers, such as a thumb and index finger, or from a finger and an iris scan. The biometric data can include fingerprint data, iris data, facial data, voice data, retinal data, hand architecture data, DNA data, or any other physical measurement pertaining to a user's person.

FIG. 1 illustrates a general architecture overview of BAS 100. As will be described in greater detail below, BAS 100 enables a biometric signature authorization process for users enrolled in a BAS. Authorization and transaction information is stored in database 104 where user records are stored. Database 104 can represent one or more databases utilized within the system. In one embodiment, database 104 is a central database to which all user records are stored and from which user records are accessed for biometric signature authorization. In another embodiment, database 104 also includes one or more operator databases to which a select set of operator records are stored and from which a select set of operator records are accessed for biometric authorization. In an additional embodiment, BAS 100 can also utilize a combination of central databases and one or more operator databases. In general, embodiments utilizing a combination of databases enable increased control of information flow throughout BAS 100. As described in detail below, various examples of information flow configurations within the system can include "open," "closed," and "selectively shared" system models. In still further embodiments, database 104 can further comprise one or more sub-databases that are contained within a particular database. In such embodiments, user data, operator data, and other system data can be distributed across multiple databases within database 104.

A user record holds user biometric information and other identity verifying information related to an individual seeking biometric authorization within the system. The information held in such a record may include, by way of illustration and without limitation, a scanned copy of a user's biometric signature authorization form, government identification number(s) and corresponding state(s) of issue, home address, email address, telephone number, and at least one biometric record. When enrolling in BAS 100, a user may present any number of identity verifying documents or testaments to his identity depending on the implementation of the biometric system. By way of illustration and not of limitation, examples of such documents or testaments include a financial token, a digital image, a video clip, family information, or a DNA sample. Depending on the particular implementation, a user record can also hold financial account information, user demographic and marketing information, and/or a user identifier, such as a system identification code (SID).

An operator record holds information useful for authenticating an operator, such as a name or ID code, device ID numbers associated with the operator, an address, and a phone number. An operator may be an individual or entity that has administrative capabilities in BAS 100, but is not directly employed by the BAS. These capabilities can range from being permitted to oversee a biometric authorization to having access to user records. For example, an operator may be a store clerk or merchant. In an alternate embodiment of the present invention, the operator records also hold employer information if the operator is an employee of an employer who is also an operator. In another embodiment of the present invention, operator records hold an operator identifier, such as an SID, and/or operator biometric data. In one scenario, an operator may need to undergo biometric authorization before administering a user's biometric authorization.

Database 104 and third-party database 108 are connected to network 102, which can be, but is not limited to, the Internet. Networks used in additional embodiments include local area networks (LANs), wide area networks (WANs), and telephone networks. Network 102 comprises connections to at least one authorization station 106 where a user can be biometrically authorized. Authorization station 106 includes at least one biometric input device (BID), one document scanner, and the necessary means for sending and receiving information to and from a user and to and from a database. These stations include but are not limited to a vending machine, a kiosk, a personal computer, a user service desk, a point of sale terminal, a telephone, or a wireless device connected via a wireless network. The BID and document scanner are illustrated in FIG. 1 as peripheral devices for purposes of emphasis only. Authorization station 106 could also include an integrated BID and/or document scanner.

Additional embodiments of the system also comprise connections to one or more third party sources in which user information, including user biometric data, is verified and/or from which user information is retrieved. In an additional embodiment, the system can be connected to one or more financial sources in order to facilitate financial biometric authorizations. For example, a user record stored at database 104 can indicate an account held at a financial institution that is to be debited during a biometrically authorized purchase.

Information transferred in the system can be encrypted. For example, information can be encrypted at one point and sent across a non-secure connection between points or not encrypted at a point of communication and sent to the other point of communication across a secure connection. Encryption and decryption of these messages can be monitored by services provided by a security company such as VeriSign. In one scenario, as an added level of security, information internal to a terminal and which is never transmitted can also be encrypted. This prevents retrieval of sensitive information (e.g., biometric data) from a stolen terminal. In an additional embodiment, the system incorporates one or more anti-tampering methods by which to recognize authentic and non-authentic system requests.

In one embodiment, the system is configured as an "open" system, where all information entered into the system is transmitted to and stored in database 104. An open system allows authorization at any authorization station (AS) 106 in the system because an open system shares user information stored in database 104 with all stations.

In an alternate embodiment, the system is configured as a "closed" system, where information entered into the system via a specific operator device is transmitted to and stored in database 104 specific to that operator, and this information is not shared with other authorization stations or other databases. This is referred to as a "closed" system because users need to enroll in the database in which they would like to perform biometric authorizations. Database 104 in closed systems may communicate with other databases, such as third-party database 108. However, all user information that is enrolled into a particular database is stored in that database. In an alternate embodiment of the closed system, information is stored in a partitioned database 104. Operator related information is stored in operator-specific partitions and is closed to all other operators. Only an authorized operator and authorized entities can access that partition of database 104. In yet an additional embodiment, information stored in one database or database partition may be stored in another database or database partition. Such an embodiment is useful for information protection in the event database information is lost or corrupted.

In a further embodiment of the present invention, user information is "selectively shared" and stored in select system multiple-operator databases or select system multiple-operator partitions within database 104. In this embodiment, a group of operators share data with each other and they can choose whether to share system information with other operators within the system. Such a system is referred to as a "selectively shared" system. This system allows a chain of operators owned by the same entity or linked in some other manner to share user information without sharing that information with all other non-designated operators registered in the system. Information in such a system can be shared between one or more databases freely or sharing can be monitored by rules set in one of these databases or a combination thereof. For example, a user could want to authorize biometric signatures only for certain operators, such as a particular merchant or service provider chain, or for particular types of operators, such as movie rental establishments or realtors. Such a system allows operators greater control over information flow while still allowing various user conveniences, such as being able to limit the types of transactions or service providers for which their biometric data can be used as an authorized signature.

The configuration of the system as an "open" system, "closed" system, or "selectively shared" system illustrates various ways of implementing the principles of the present invention. System configuration could be determined by the system in which user information is used. For example, a merchant who is an operator in the system and who accepts biometrically signed customer agreements could have a system configured with his own database and authorization stations connected to that database. In this system configuration, the merchant's database files only exist on the database and are retrieved or accessed for biometric signature authorization only by pre-determined stations connected to the database; therefore, the system would be a "closed" system.

Figure 2:
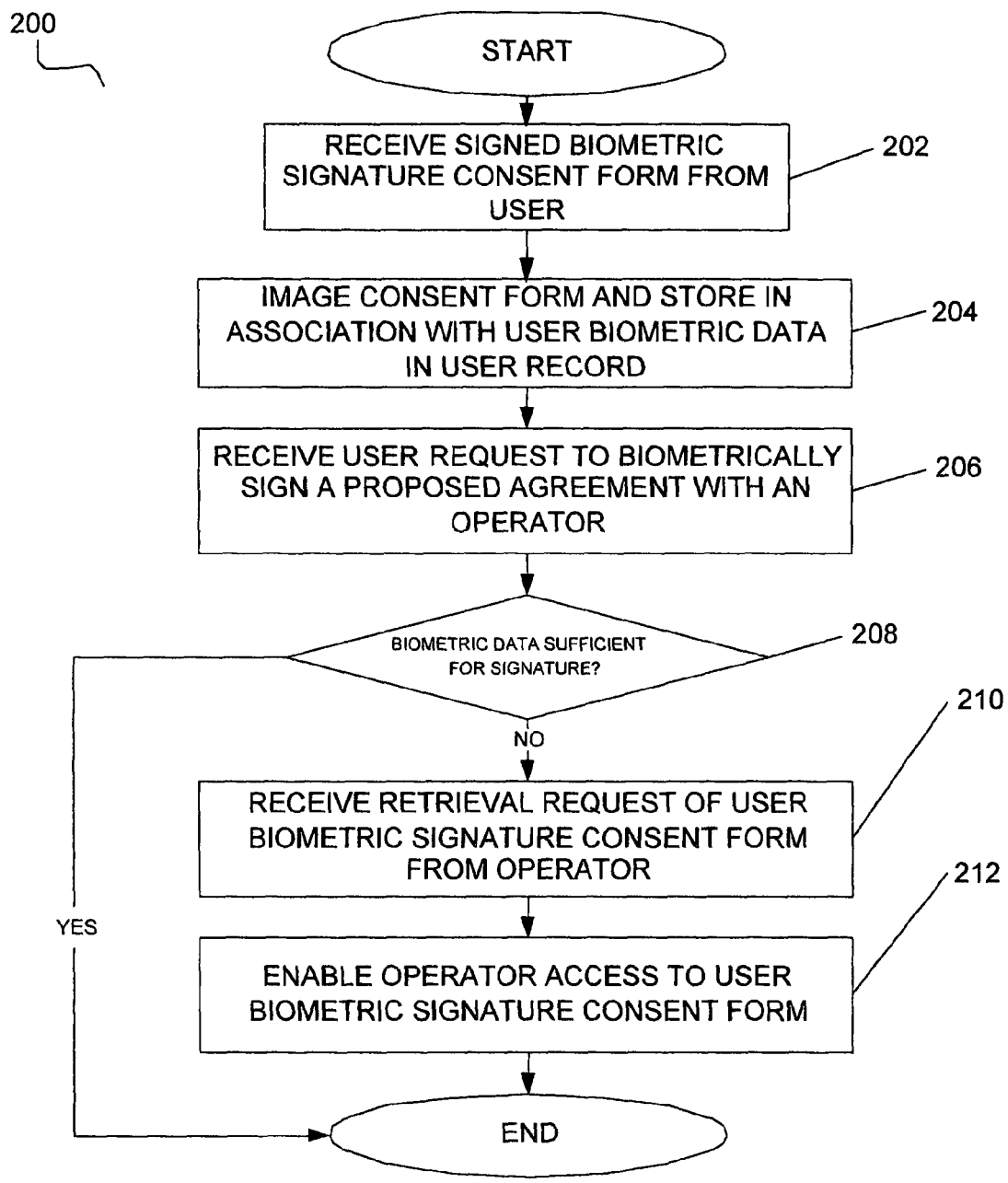
FIG. 2 illustrates a flowchart of a process of authorizing the submission of a user's biometric data as a legal substitute for a handwritten signature and enabling access to the authorization by operators entering into transactions with the user.

FIG. 2 illustrates a process for authorizing the submission of a user's biometric data as a legal substitute for his handwritten signature. At step 202, a signed biometric signature consent form is received from a user, the form including a contractual statement authorizing the substitution of the user's biometric data for a written signature for the purpose of consenting to transactions with operators. As an example, the statement might read: "I am approving the use of my submitted biometric data in lieu of a conventional signature for the purpose of providing consent to transactions with all parties. I acknowledge that my submitted biometric data carries the full weight and legal responsibility of my signature."

At step 204, the consent form is scanned or otherwise imaged and saved as an electronic document in association with the user record at database 104. In addition, the user's biometric data is associated with the electronic document. In one embodiment, the user's registered biometric data is already stored in the user record and is associated with the electronic document by the system. In another embodiment, the user submits biometric data, possibly as part of a general enrollment process in BAS 100, at AS 106 when submitting the biometric signature consent form, and the user's biometric data is attached to the electronic document. For example, the user's biometric data could be embedded with or added to the electronic document, or algorithm-generated data based on the user's biometric data could be appended to the electronic document. To further validate the biometric data, the biometric data could also contain a time stamp to verify the time and date of the submission of the biometric signature consent form and biometric data in the user record. The biometric data could additionally contain an embedded digital watermark, serial number, or a digital image with encrypted hashing. For example, each BID could generate a pixel pattern that would be embedded in the digital image, and each BID could further generate a unique pattern, watermark or identifying number. Moreover, BAS 100 could create and store a video record in order to further verify the user's intent.

In addition, a user's physical biometric sample, such as an ink fingerprint, could be affixed to the original consent form before imaging, or the written signature could be notarized. The hard copy of the signed consent form can be maintained on file by the system at one or more storage locations. In one embodiment, the user could also receive a printed receipt for the authorization agreement, which could include terms of the agreement as well as a means for revocation of the authorization.

In another embodiment, the biometric signature consent form is not produced physically but rather displayed electronically, and the user acknowledges agreement either by submitting an electronic signature, such as with a stylus on an electronic pad, that is stored as an image along with the electronic signature agreement. Alternatively, users can simply select "yes" from a yes/no option on a touch screen or keypad to authorize their biometric data as a legal signature.

At step 206, the user subsequently submits biometric data for the purpose of electronically signing a proposed transaction with an operator. Such transactions might include financial transactions at a point of sale or contractual agreements, such as rental agreements, leasing agreements, and so forth, between the user and operator, or any other user action that might require the submission of a legally binding signature, for example, the creation of a living will or health care power of attorney and the like. At step 208, a determination is made as to the sufficiency of biometric data as a signature for the transaction. For example, if the transaction could be considered low risk, such as a video rental agreement, and would not require the retrieval of the signed consent form, the process could proceed to completion with the submission of the user's biometric as an electronic signature. An operator could additionally set a default preference where the signed consent form is requested only for particular types of transactions. For example, affixing a biometric signature to a transaction that incurs a significant financial risk over a period of time, such as a mortgage loan, might automatically require that the signed consent form be held on file. Parameters for sufficiency of a biometric signature could be set with respect to type of transaction, type of merchant, type of user and the like. In an additional embodiment, the system could check a user record to determine if the user has a stored biometric signature consent form available on file. The transaction could proceed if the user does have a stored form, or the operator could have the option of continuing or ending the transaction if the user does not have a stored form. If the user does not have a consent form on file, the operator could also be enabled to print a copy of the biometric signature consent form for the user to sign, and store this document in the system for future transactions. At step 210, the operator requests retrieval of the electronically stored biometric signature consent form, if available.

At step 212, BAS 100 enables operator access to the user's stored biometric signature consent form. In one embodiment, the operator can download the electronic document and print a hard copy and/or view the document electronically. Alternatively, an operator requesting confirmation of a user's stored biometric signature consent form can simply receive a confirmation message, such as a yes/no answer to his query, upon accessing the user record. Upon satisfactory retrieval of the biometric signature consent form or confirmation of its existence, the operator and user can proceed with the proposed transaction, with the user's biometric data functioning as his signature.

In an additional embodiment, the user's biometric data can be submitted in tandem with another means of identity verification in order to function as an electronic signature. For example, the user can also present his driver's license or credit card, supply a pass code or answer a question based on user knowledge as a supplemental verification.

In one embodiment, a user may have a limited period of time to revoke the biometric signature authorization agreement. Alternatively, the user could be required to "opt-out" of the agreement by negatively responding to an email or other communication from BAS 100 within a set period of time after his receipt of the communication.

As an additional feature, BAS 100 could maintain records of the user's biometric signature submissions in database 104, providing the user with a centralized filing history of biometrically signed transactions. The records could also contain sequential order assignments of submitted biometric signatures, categorize biometric signatures by number and type, and note missing biometric signatures in the numerical sequence. This feature would provide operators and users with an additional safeguard against potential fraudulent submissions of biometric data, and provide users with a means of tracking and categorizing transactions for which they submit a biometric signature. BAS 100 could also track transaction terms and expiration dates, send the user reminders and notices associated with the transactions, and the like.

In an additional embodiment, the invention provides a method for authorizing Automated Clearing House (ACH) transactions in which ACH authorizations can be pre-arranged, allowing a receiver to grant blanket or per-transaction authorizations to multiple transaction originators affiliated with BAS 100 when a receiver registers his biometric signature and ACH information with BAS 100.

A system and method of authorizing the submission of a user's biometric data as a legal substitute for a handwritten signature has been illustrated. It will be appreciated by those skilled in the art that the system and method of the present invention can be used to authorize the submission of biometric data as an electronic signature in a biometric authorization system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method, comprising:
   receiving, at a processing device, an electronic document that is a scanned copy of a physical document, the electronic document including a handwritten signature of a user and serving as a legally binding statement authorizing a substitution of the user's biometric data for a handwritten signature for a purpose of consenting to a transaction between the user and at least one operator;
   receiving at the processing device, biometric data from the user;
   embedding, by the processing device, a digital watermark in the received biometric data, the digital watermark being an indication of validation of the received biometric data;
   appending to the electronic document by the processing device the received biometric data embedded with the digital watermark;
   storing, at a data store operably connected to the processing device, the electronic document appended with the received biometric data embedded with the digital watermark in a user record for the user in an authorization system, wherein the user's biometric data identifies the user record;
   receiving, by the data processing device from an authorization station device of the operator to which the user has presented biometric data to authorize a proposed transaction, an instruction to retrieve the electronic document appended with the received biometric data embedded with the digital watermark;
   retrieving, by the processing device, the electronic document appended with the received biometric data embedded with the digital watermark; and
   transmitting, via the authorization station device at the time of the proposed transaction, the electronic document appended with the received biometric data embedded with the digital watermark to the operator, wherein the electronic document appended with the received biometric data embedded with the digital watermark verifies that receipt of the user's biometric data indicates legal user consent to the proposed transaction.

2. The method of claim 1, wherein the user initiates the instruction to retrieve the electronic document appended with the received biometric data embedded with the digital watermark.

3. The method of claim 2, wherein the user initiation is indicated via a selection of an approval button after terms of the proposed transaction have been made available for review by the user.

4. The method of claim 2, wherein the user initiation is indicated via provision of biometric data after terms of the proposed transaction have been made available for review by the user.

5. The method of claim 1, wherein the instruction to retrieve the electronic document appended with the received biometric data embedded with the digital watermark is indicated by notice of the operator conducting the proposed transaction to the user, wherein the operator conducting the proposed transaction with the user is authorized to enable release of the electronic document appended with the received biometric data embedded with the digital watermark.

6. The method of claim 5, wherein the operator conducting the proposed transaction to the user is an employee of a business, and the electronic document appended with the received biometric data embedded with the digital watermark binds the business to the proposed transaction.

7. The method of claim 1, wherein the operator is approved to administer receiving user biometric data, wherein the approval is based upon receiving operator biometric data.

8. The method of claim 7, wherein the approval is based on a match of received operator biometric data to a stored operator biometric data.

9. The method of claim 1, wherein the electronic document authorizes transactions with the at least one of an operator and a service provider affiliated with the system.

10. The method of claim 9, wherein the document designates the at least one operator and service providers.

11. The method of claim 1, comprising receiving from the user additional identity verification information.

12. The method of claim 1, wherein the user is issued a receipt acknowledging the authorization of the substitution of the user's biometric data as a substitute for the user's handwritten signature.

13. The method of claim 12, wherein the receipt contains one or more of a term and a condition of the authorization.

14. The method of claim 13, wherein the receipt includes a method of revocation of the authorization.

15. The method of claim 1, wherein the instruction to retrieve the electronic document appended with the received biometric data embedded with the digital watermark is based on an evaluation of a transaction type including one or more of a financial transaction, a rental agreement, a leasing agreement, a mortgage loan, a living will, and a power of attorney.

16. The method of claim 1, wherein receiving the electronic document that is a scanned copy of a physical document further comprises scanning the physical document once the user has signed it.

17. The method of claim 16, wherein the operator is approved to scan the physical document.

* * * * *